Patented May 23, 1933

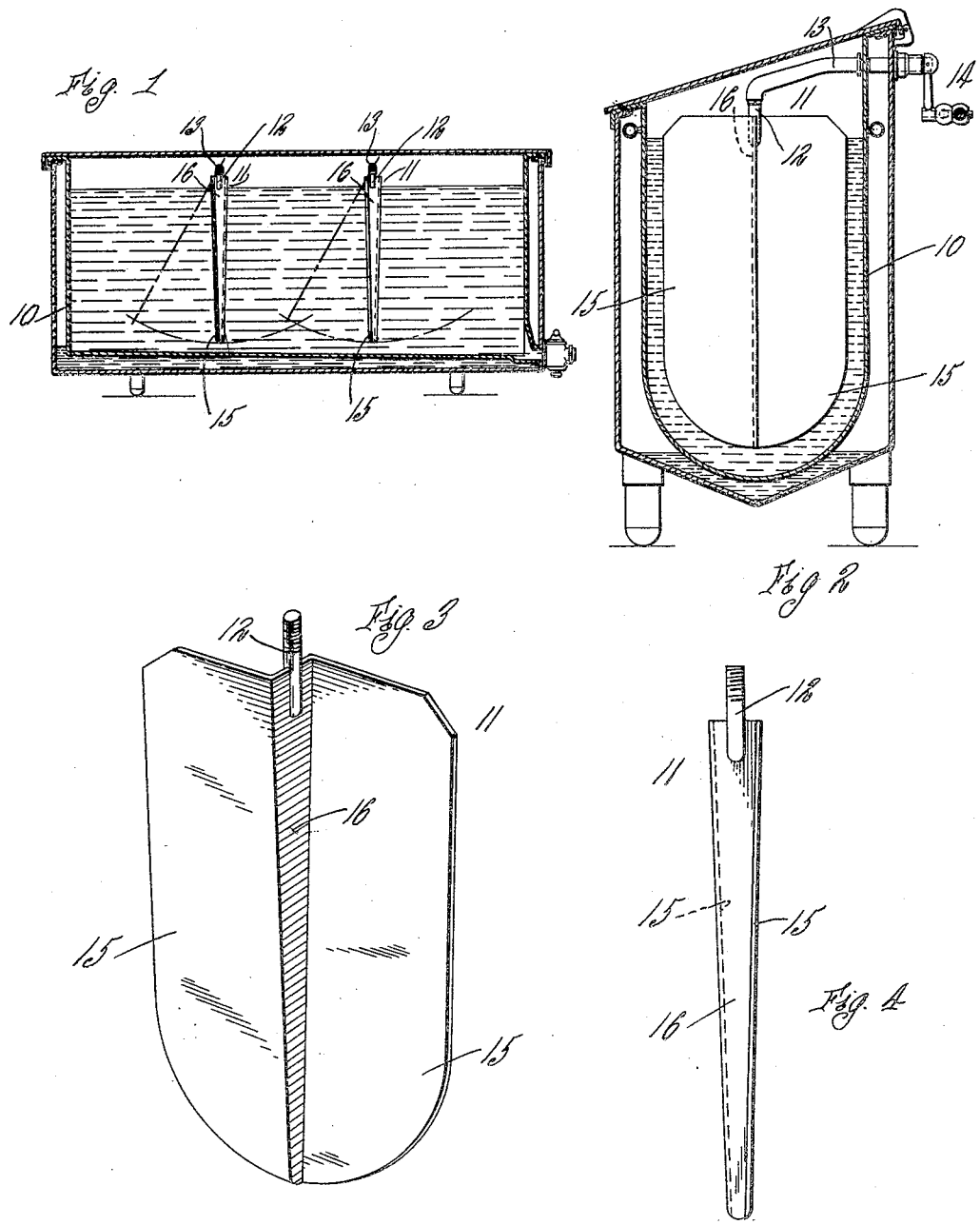

1,910,258

UNITED STATES PATENT OFFICE

RALPH K. MINER, OF ORISKANY FALLS, NEW YORK, ASSIGNOR TO CHERRY-BURRELL CORPORATION, OF WILMINGTON, DELAWARE, A CORPORATION OF DELAWARE

AGITATOR PADDLE AND THE LIKE

Application filed January 30, 1932. Serial No. 589,838.

This invention relates to paddles or analogous devices such as used, for instance, for agitating or stirring the milk in milk pasteurizers, heaters or coolers of that sort in which a body of milk in a vat is agitated by paddles which are moved or reciprocated back and forth in the milk for the purpose of insuring contact of all portions of the milk with the heat exchange surfaces of the vat. In apparatus of this sort, the body of milk is of considerable depth and width, and in order to insure the proper agitation or movement of the milk, the blades of the paddles are commonly made of a height and breadth approximating the cross-sectional dimensions of the body of milk. Therefore, the pressure against the surfaces of the paddles in their reciprocations in the milk is considerable and places the connections between the paddles and their actuating means under a heavy strain.

Plate or sheet metal paddles are desirable in apparatus of this sort, but it has been found difficult to obtain the desired rigidity in blades of ordinary dimensions, particularly in the locality of the attachment of the blade to its operating shank or member, without making the blades of objectionably thick and heavy metal plates. A light weight sheet will flex objectionably and the repeated flexing of the blade in opposite directions, due to the pressure acting alternately in opposite directions on the paddles, is apt to rupture the blade at or near the attachment of its actuating shank or member.

The objects of my invention are to provide a paddle or analogous device of the sort mentioned which is of simple and inexpensive but strong and rigid construction, and which will not bend in use, but which can be made of a plate of sheet metal of thin gage; and also to construct the paddle so that while it is of light weight and inexpensive, it will be stiff and rigid and will not bend or break in the use of the same, particularly in the locality of the attachment of the blade to its operating shank or member; and also to produce a desirable paddle having a blade consisting of a single plate of relatively thin metal which is bent so as to stiffen the blade and cause the strain on the blade at the point of attachment of its operating shank to act in an edgewise direction on the blade, thereby insuring a strong, rigid connection between the blade and shank and preventing bending or breaking of the paddle in this locality.

In the accompanying drawing:

Fig. 1 is a longitudinal section on a reduced scale, of a spray vat milk pasteurizer equipped with agitator paddles embodying my invention.

Fig. 2 is a somewhat enlarged, transverse sectional elevation thereof.

Fig. 3 is a perspective view, further enlarged, of one of the paddles detached.

Fig. 4 is an edge view of the paddle.

As illustrated in Figs. 1 and 2, the paddles forming the subject matter of this invention are used in a pasteurizer of the spray vat type in which a body of milk in the vat 10 is adapted to be heated or cooled by a liquid caused to flow over the outer surfaces of the metal lining of the jacketed vat. The milk is agitated to cause all portions thereof to contact with the heat exchange walls of the vat, by the paddles 11, two of which are shown, each consisting of a sheet metal blade having a shank or member 12 attached to its upper end and connected to a rock shaft 13. The shafts 13 for the two paddles are rocked by suitable mechanism 14 for oscillating the paddles to and fro in the body of milk in the vat 10.

As is clearly shown in Figs. 3 and 4, the body or blade of the paddle 11 consists of a thin plate of metal, the size and shape of which may vary, depending upon the form of the apparatus in which the paddle is to be used or upon requirements of the particular operation in which the paddle is to be employed.

This sheet metal plate forming the blade is bent longitudinally into substantially Z-shape in cross section providing two opposite wings or portions 15 extending in opposite directions from the opposite edges of an intermediate transverse web or portion 16 which preferably, as shown, extends throughout the length of the blade and is of greatest width at the upper end of the blade and tapers from this end to its opposite end. The actuating shank or member 12 is attached to this transverse web 16 to which it may be fastened in any suitable manner, as for instance, by slotting the shank longitudinally to receive the upper end of the web, and welding or otherwise rigidly securing the shank to the web.

It will be noted that the intermediate web 16 extends transversely of the planes of the wings or portions 15 of the blades or edgewise in the direction in which the shank 12 moves in reciprocating the paddles. Therefore, the strain from the torque of the shank is applied edgewise of this transverse web 16 or portion of the blade to which the shank is attached instead of flatwise or transversely of the plane of the blade, as is the case with paddles as heretofore constructed. By this Z-shaped formation of the blade the wing portions 15 of the blade form in effect lateral flanges at the opposite edges of the web 16 which stiffen and strengthen this web in the manner of the edge flanges of a plate metal beam. As a result, the blade, while being formed of thin sheet metal and being of light weight, nevertheless has great strength and rigidity since the transverse web, which preferably extends the full length of the blade, practically prevents flexure of the blade throughout its length.

I claim:

A paddle blade consisting of a single thin metal plate bent into substantially Z-shape in cross section to form opposite portions connected by an intermediate portion extending transversely of the planes of said opposite portions, and an actuating shank fixed to said intermediate portion and by which the paddle is moved in a direction substantially parallel with the plane of said intermediate portion, whereby the strain is applied by said actuating member to said intermediate portion in the direction of its plane and does not tend to bend said portion.

RALPH K. MINER.